United States Patent Office 3,562,284
Patented Feb. 9, 1971

---

3,562,284
2-(SUBSTITUTED) SULFONYL-5-TRIFLUORO-METHYL-1,3,4-THIADIAZOLES
Howard Newman, Monsey, N.Y., and Andrew Stephen Tomcufcik, Old Tappan, N.J., assignors to American Cyanamid Company, Stamford, Conn., a corporation of Maine
No Drawing. Filed Feb. 5, 1968, Ser. No. 702,825
Int. Cl. C07d 91/62
U.S. Cl. 260—302                                    10 Claims

ABSTRACT OF THE DISCLOSURE

This disclosure describes compounds of the class of 2-(substituted)sulfonyl - 5-trifluoromethyl-1,3,4-thiadiazoles useful as antifungal agents.

BRIEF SUMMARY OF THE INVENTION

This invention relates to new organic compounds and, more particularly, is concerned with novel 2-(substituted) sulfonyl - 5 - trifluoromethyl - 1,3,4 - thiadiazoles and methods of preparing these compounds. The novel compounds of the present invention may be represented by the following general formula:

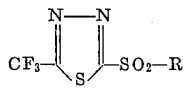

wherein R is lower alkyl, phenyl lower alkyl, phenyl or para-substituted-phenyl. Suitable lower alkyl groups contemplated by the present invention are those having up to 6 carbon atoms such as methyl, ethyl, isopropyl, n-butyl, sec-butyl, n-amyl, tert-amyl, n-hexyl, isohexyl, and the like. Phenyl lower alkyl is exemplified by benzyl, α-phenylethyl, β-phenylethyl, etc. Suitable para-substituted-phenyl groups may be, for example, p-nitrophenyl, p-acetamidophenyl, p-chlorophenyl, p-bromophenyl, p-methoxyphenyl, p-tolyl, p-sulfonamidophenyl, and the like.

DETAILED DESCRIPTION OF THE INVENTION

The novel compounds of the present invention are generally obtainable as white crystalline materials having characteristic melting points and absorption spectra. They are appreciably soluble in many organic solvents such as methanol, ethanol, acetone, ethyl acetate, etc. but are relatively insoluble in water.

The novel 2-(substituted)sulfonyl - 5-trifluoromethyl-1,3,4-thiadiazoles of the present invention may be readily prepared either from an appropriate carbazic acid dithio-ester and trifluoroacetic anhydride or from an appropriate sodium thiolate and 2-methylsulfonyl-5-trifluoromethyl-1,3,4-thiadiazole as illustrated in the following reaction scheme:

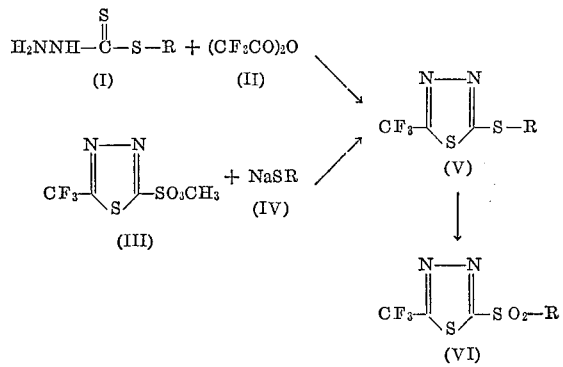

wherein R is as hereinabove defined. In accordance with the above reaction scheme, a condensation reaction of an appropriate carbazic acid dithioester (I) with trifluoroacetic anhydride (II) produces the corresponding 2-(substituted)thio - 5-trifluoromethyl - 1,3,4-thiadiazole (V). This condensation reaction is conveniently carried out in an excess of the trifluoroacetic anhydride as solvent at the refluxing temperature of the reaction mixture for a period of time of from about half an hour to several hours or more. The product is conveniently isolated merely by evaporation of the excess trifluoroacetic anhydride. Alternatively, the interaction of 2-methylsulfonyl-5-trifluoromethyl-1,3,4-thiadiazole (III) with an appropriate sodium thiolate (IV) forms the corresponding 2-(substituted) thio-5-trifluoromethyl - 1,3,4-thiadiazole (V). This reaction is conveniently carried out in a lower alkanol solvent at room temperature for a period of time of from about 12 hours to about 24 hours. Again, the product is conveniently isolated merely by evaporation of the solvent. The oxidation of the intermediate 2-(substituted)thio-5-trifluoromethyl - 1,3,4-thiadiazoles (V) to the corresponding 2-(substituted)sulfonyl - 5-trifluoromethyl-1,3,4-thiadiazoles (VI) of the present invention may be accomplished with oxidizing agents such as potassium permanganate, hydrogen peroxide, or peroxytrifluoroacetic acid. The oxidation with potassium permanganate is carried out in an essentially aqueous acidic medium at temperatures close to 65° C. for a period of time of about half an hour. The oxidation with hydrogen peroxide or peroxytrifluoroacetic acid is carried out using methylene chloride as solvent at the refluxing temperature of the reaction mixture for a period of time of from about one hour to several hours or more. The products are isolated and purified by standard procedures well known to those skilled in the art and as described in the examples hereinafter.

The novel compounds of the present invention are biologically active and have been found to possess antifungal activity. The antifungal spectrum of the compounds of this invention, representing the amount required to inhibit the growth of various typical fungi, was determined in a standard manner by the agar dilution streak technique as follows. In the assay, various concentrations of test compound are made up in 10 milliliter portions of fluid nutrient agar. These dilutions are then poured into petri dishes and hardened. Spore suspensions of the test organisms are streaked on the agar surfaces, and the plates are suitably incubated and then read. By way of illustration, the minimal inhibitory concentrations, expressed in micrograms per milliliter, of five typical compounds of the present invention against various test organisms is set forth in Table I below:

TABLE I $$CF_3 \underset{S}{\overset{N-N}{\diagdown \diagup}} SO_2-R$$

| Organism | p-Nitrophenyl | Benzyl | Methyl | Phenyl | Butyl |
|---|---|---|---|---|---|
| Candida albicans | 15 | 31 | 15 | 15 | 3.1 |
| Cryptococcus neoformans. | 6.2 | | 6.2 | 6.2 | 3.1 |
| Saccharomyces cerevisiae. | 3.1 | 15 | 6.2 | 6.2 | |
| Mucor ramannianus | 3.1 | 15 | 1.5 | 3.1 | |
| Fusarium epiphaeria | 1.5 | 31 | 3.1 | 6.2 | |
| Hormodendrum cladosporoides. | 3.1 | 31 | 3.1 | 3.1 | |
| Trichophyton mentagrophytes. | 1.5 | 15 | 1.5 | 1.5 | 1.5 |
| Microsporum gypseum | 1.5 | 8 | 1.5 | 6.2 | 3.1 |
| Penicillium digitatum | | 15 | 1.5 | 15 | |
| Memnoniella echinata | 31 | >250 | 6.2 | 15 | |
| Chaetomium globosum | 15 | 4 | 1.5 | 3.1 | |
| Aspergillus fumigatus | 31 | 31 | 6.2 | 6.2 | |

The novel compounds of the present invention are active against *Microsporum canis* when tested in guinea pigs as follows. Male albino guinea pigs, 300–500 g. (five animals per test group and five controls) are infected dermally at a prepared site with 0.5 ml. of a 1 to 10 dilution of a standard *M. canis* infective hair suspension. The test compounds are incorporated into ointments at concentrations of 5%, 1%, and 0.2% in a mixture of solid polyethylene glycols having a molecular weight averaging about 400 and about 4,000. Griseofulvin, a known antifungal agent, in the same polyethylene glycol mixture at a concentration of 1% is included in the procedure as a positive control. Treatment is applied to the infected lesion once daily for 5 days starting on the third day postinfection. About 0.5 g. of ointment containing a particular test compound is applied topically at each treatment. Test animals are scored on day 10 and day 17 postinfection as to the relative concentration of viable organisms per hair sample. Essentially this is carried out by removing four tufts of hair from the infected area of each test animal. The hair is thoroughly macerated in 5 ml. of medicated Sabouraud's medium and a 0.5 ml. portion is seeded in an agar plate containing 1% enzymatic protein digest, 1% dextrose, 1.5% dehydrated fresh oxbile preparation, 2% agar, and 0.001% crystal violet. The plates were examined for typical *M. canis* growth after incubation for 7 days at 30°±2° C. The amount of growth was rated as follows: 0=no spore colonies; 1=1–10 spore colonies; 2=11–100 spore colonies; 3=101–1000 spore colonies; and 4=>1000 spore colonies. In a representative operation, and merely by way of illustration, the hair culture score obtained in the above test with three typical compounds of the present invention at the indicated concentrations is set forth in Table II below:

TABLE II

| Compound | Hair culture score, day 10/day 17 postinfection | | |
|---|---|---|---|
| | 5% | 1% | 0.2% |
| 2-methylsulfonyl-5-triflu romethyl-1,3,4-thiadiazole | 1/2 | 1/3 | 4/4 |
| 2-phenylsulfonyl-5-trifluoromethyl-1,3,4-thiadiazole | 1/2 | 2/2 | 3/4 |
| 2-benzylsulfonyl-5-trifluoromethyl-1,3,4-thiadiazole | 2/2 | 2/3 | 4/4 |
| Griseofulvin | 0/1 | 0/1 | 1/2 |

The excellent activity against dermatophytic Trichophyton and Microsporum species (see Tables I and II), coupled with the relative chemical stability of the novel compounds of the present invention, makes them useful in the treatment of fungal infections of the skin of warm-blooded animals. For such use these compounds may be formulated with appropriate topically useful carriers such as wetting agents, stabilizing agents, dusting powders, ointments, creams, lotions, etc. The formulated compounds can be applied topically to the infected skin area. The topical compositions may contain from 0.2% to 5% of active component with a topically acceptable carrier.

The invention will be described in greater detail in conjunction with the following specific examples.

EXAMPLE 1

Preparation of 2-methylthio-5-trifluoromethyl-1,3,4-thiadiazole

After the addition of 30 g. of carbazic acid dithiomethyl ester to 160 g. of trifluoroacetic anhydride cooled in an ice bath, the mixture was allowed to reflux 25–30 minutes with constant magnetic stirring. At the end of this period the mixture was cooled and the excess anhydride evaporated. The residue was dissolved in ether and the ether was extracted consecutively with small portions of water, dilute base, and water. Removal of the solvent by evaporation yielded 42.6 g. of oil. A portion (21 g.) of this oil was distilled to yield 10 g. of product, B.P. 40–42° C. at ca. 0.1 mm.

EXAMPLE 2

Preparation of 2-isopropylthio-5-trifluoromethyl-1,3,4-thiadiazole

In place of the carbazic acid dithiomethyl ester of Example 1, there is employed an equimolar quantity of carbazic acid dithioisopropyl ester whereby the 2-isopropylthio-5-trifluoromethyl-1,3,4-thiadiazole is obtained.

EXAMPLE 3

Preparation of 2-sec-butylthio-5-trifluoromethyl-1,3,4-thiadiazole

Example 1 is repeated but employing an equimolar amount of carbazic acid dithio-sec-butyl ester in place of the carbazic acid dithiomethyl ester of that example. There is thus obtained the 2-sec-butylthio-5-trifluoromethyl-1,3,4-thiadiazole.

EXAMPLE 4

Preparation of 2-isohexylthio-5-trifluoromethyl-1,3,4-thiadiazole

By replacing the carbazic acid dithiomethyl ester employed in Example 1 by an equimolecular quantity of carbazic acid dithioisohexyl ester and following substantially the same procedure described in Example 1, there is obtained the 2-isohexylthio-5-trifluoromethyl-1,3,4-thiadiazole.

EXAMPLE 5

Preparation of 2-β-phenylethylthio-5-trifluoromethyl-1,3,4-thiadiazole

The procedure of Example 1 is repeated substituting an equimolecular amount of carbazic acid dithio-β-phenylethyl ester for the carbazic acid dithiomethyl ester employed in that example. There is thus obtained the 2-β-phenylethylthio-5-trifluoromethyl-1,3,4-triadiazole.

EXAMPLE 6

Preparation of 2-phenylthio-5-trifluoromethyl-1,3,4-thiadiazole

After the addition of 2.38 g. of sodium thiophenoxide in alcohol to an alcoholic solution of 5 g. of 2-methylsulfonyl-5-trifluoromethyl-1,3,4-thiadiazole, the reaction mixture was allowed to stand overnight. The solvent was then evaporated and water was added causing an oil to separate. The oil was extracted with ether. The ether extracts were combined, washed with water, 2 N potassium hydroxide, and finally with water. The ether was removed by evaporation leaving a residual oil, weight 5 g. (88% yield). The compound was characterized by infrared analysis.

EXAMPLE 7

Preparation of 2-p-nitrophenylthio-5-trifluoromethyl-1,3,4-thiadiazole

In place of the sodium thiophenoxide of Example 6, there is employed an equimolar quantity of sodium p-nitrothiophenoxide whereby the 2-p-nitrophenylthio-5-trifluoromethyl-1,3,4-thiadiazole is obtained. The compound was characterized by infrared analysis.

EXAMPLE 8

Preparation of 2-p-chlorophenylthio-5-trifluoromethyl-1,3,4-thiadiazole

Example 6 is repeated but employing an equimolar amount of sodium p-chlorothiophenoxide in place of the sodium thiophenoxide of that example. There is thus obtained the 2-p-chlorophenylthio-5-trifluoromethyl-1,3,4-thiadiazole.

EXAMPLE 9

Preparation of 2-p-sulfonamidophenylthio-5-trifluoromethyl-1,3,4-thiadiazole

By replacing the sodium thiophenoxide employed in Example 6 by an equimolecular quantity of sodium p-sulfonamidothiophenoxide and following substantially the same procedure described in Example 6, there is obtained the 2-p-sulfonamidophenylthio - 5 - trifluoromethyl-1,3,4-thiadiazole.

EXAMPLE 10

Preparation of 2-n-butylthio-5-trifluoromethyl-1,3,4-thiadiazole

The procedure of Example 6 is repeated substituting an equimolecular amount of sodium thiobutoxide for the sodium thiophenoxide employed in that example. There is thus obtained the 2-n-butylthio-5-trifluoromethyl-1,3,4-thiadiazole. The compound was characterized by infrared analysis.

EXAMPLE 11

Preparation of 2-benzylsulfonyl-5-trifluoromethyl-1,3,4-thiadiazole

Forty grams of potassium permanganate in 760 ml. of water was added to a stirred solution of 15.8 g. of 2-benzylthio-5-trifluoromethyl-1,3,4 - thiadiazole [J.A.C.S., 77, 400 (1955)] in 100 ml. of acetic acid at 65° C. A solid precipitated. The mixture was stirred for 30 minutes at 65° C. and then diluted with one liter of water. The mixture was decolorized by bubbling in sulfur dioxide, the solid was collected, washed with water and dried. The product was recrystallized from ethanol; yield 10 g., M.P. 138–139° C.

EXAMPLE 12

Preparation of 2-methylsulfonyl-5-trifluoromethyl-1,3,4-thiadiazole

In place of the 2-benzylthio-5-trifluoromethyl-1,3,4-thiadiazole of Example 11, there is employed an equimolar quantity of 2-methylthio-5-trifluoromethyl - 1,3,4-thiadiazole whereby the 2 - methylsulfonyl-5-trifluoromethyl-1,3,4-thiadiazole is obtained in equally good yield. The product, recrystallized from a mixture of diethyl ether and n-hexane, melted at 85.5–87° C.

EXAMPLE 13

Preparation of 2-isopropylsulfonyl-5-trifluoromethyl-1,3,4-thiadiazole

Example 11 is repeated but employing an equimolar amount of 2-isopropylthio-5-trifluoromethyl-1,3,4-thiadiazole in place of the 2-benzylthio-5-trifluoromethyl-1,3,4-thiadiazole of that example. There is thus obtained the 2-isopropylsulfonyl-5-trifluoromethyl-1,3,4-thiadiazole.

EXAMPLE 14

Preparation of 2-sec-butylsulfonyl-5-trifluoromethyl-1,3,4-thiadiazole

By replacing the 2-benzylthio-5-trifluoromethyl-1,3,4-thiadiazole employed in Example 11 by an equimolecular quantity of 2-sec-butylthio-5-trifluoromethyl-1,3,4-thiadiazole and following substantially the same procedure described in Example 11, there is obtained the 2-sec-butylsulfonyl-5-trifluoromethyl-1,3,4-thiadiazole.

EXAMPLE 15

Preparation of 2-phenylsulfonyl-5-trifluoromethyl-1,3,4-thiadiazole

The procedure of Example 11 is repeated substituting an equimolecular amount of 2-phenylthio-5-trifluoromethyl-1,3,4-thiadiazole for the 2-benzylthio-5-trifluoromethyl-1,3,4-thiadiazole employed in that example. There is thus obtained the 2-phenylsulfonyl-5-trifluoromethyl-1,3,4-thiadiazole. The recrystallized product melted at 78.5–82° C.

EXAMPLE 16

Preparation of 2-p-nitrophenylsulfonyl-5-trifluoromethyl-1,3,4-thiadiazole

In place of the 2-benzylthio-5-trifluoromethyl-1,3,4-thiadiazole of Example 11, there is employed an equimolar quantity of 2-p-nitrophenylthio-5-trifluoromethyl-1,3,4-thiadiazole whereby the 2-p-nitrophenylsulfonyl-5-trifluoromethyl-1,3,4-thiadiazole is obtained in equally good yield. The recrystallized product melted at 137.5–139° C.

EXAMPLE 17

Preparation of 2-n-butylsulfonyl-5-trifluoromethyl-1,3,4-thiadiazole 4.4 grams of 2-n-butylthio-5-trifluoromethyl-1,3,4-thiadiazole was added to a magnetically stirred solution of 3 g. of 90% hydrogen peroxide and 18 g. of trifluoroacetic anhydride in methylene chloride and the mixture was refluxed for 4 hours. The solvent was concentrated on the steam bath and ice water added. A solid precipitated and was collected by filtration: 2.1 g., M.P. 38–41° C. Recrystallization of the crude product from petroleum ether and subsequent sublimation yielded the purified product: 0.70 g., M.P. 42–44° C.

EXAMPLE 18

Preparation of 2-isohexylsulfonyl-5-trifluoromethyl-1,3,4-thiadiazole

Example 17 is repeated but employing an equimolar amount of 2-isohexylthio-5-trifluoromethyl-1,3,4 - thiadiazole in place of the 2-n-butylthio-5-trifluoromethyl-1,3,4-thiadiazole of that example. There is thus obtained the 2-isohexylsulfonyl-5-trifluoromethyl-1,3,4-thiadiazole.

EXAMPLE 19

Preparation of 2-β-phenylethylsulfonyl-5-trifluoromethyl-1,3,4-thiadiazole

By replacing the 2-n-butylthio-5-trifluoromethyl-1,3,4-thiadiazole employed in Example 17 by an equimolecular quantity of 2-β-phenylethylthio-5-trifluoromethyl - 1,3,4-thiadiazole and following substantially the same procedure described in Example 17, there is obtained the 2-β-phenylethylsulfonyl-5-trifluoromethyl-1,3,4-thiadiazole.

EXAMPLE 20

Preparation of 2-p-chlorophenylsulfonyl-5-trifluoromethyl-1,3,4-thiadiazole

The procedure of Example 17 is repeated substituting an equimolecular amount of 2-p-chlorophenylthio-5-trifluoromethyl - 1,3,4 - thiadiazole for the 2-n-butylthio-5-trifluoromethyl - 1,3,4 - thiadiazole employed in that example. There is thus obtained the 2-p-chlorophenylsulfonyl-5-trifluoromethyl-1,3,4-thiadiazole.

EXAMPLE 21

Preparation of 2-p-sulfonamidophenylsulfonyl-5-trifluoromethyl-1,3,4-thiadiazole In place of the 2-n-butylthio-5-trifluoromethyl - 1,3,4 - thiadiazole of Example 17, there is employed an equimolar quantity of 2-p-sulfonamidophenylthio - 5 - trifluoromethyl-1,3,4 - thiadiazole whereby the 2-p-sulfonamidophenylsulfonyl-5-fluoromethyl - 1,3,4 - thiadiazole is obtained.

We claim:
1. A compound selected from the group consisting of those of the formula:

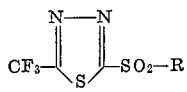

wherein R is selected from the group consisting of lower alkyl, phenyl lower alkyl, phenyl, p-nitrophenyl, p-acetamidophenyl, p-chlorophenyl, p-bromophenyl, p-methoxyphenyl, p-tolyl and p-sulfonamidophenyl.

2. A compound according to claim 1 wherein R is methyl.
3. A compound according to claim 1 wherein R is ethyl.
4. A compound according to claim 1 wherein R is n-butyl.
5. A compound according to claim 1 wherein R is benzyl.
6. A compound according to claim 1 wherein R is α-phenylethyl.
7. A compound according to claim 1 wherein R is phenyl.
8. A compound according to claim 1 wherein R is p-nitrophenyl.
9. A compound according to claim 1 wherein R is p-tolyl.
10. A compound according to claim 1 wherein R is p-methoxyphenyl.

References Cited
UNITED STATES PATENTS 3,287,463   11/1966   Rufenacht _____ 260—302

ALTON D. ROLLINS, Primary Examiner

U.S. Cl. X.R.

260—455; 424—270